(12) United States Patent
Kondo et al.

(10) Patent No.: US 7,050,265 B2
(45) Date of Patent: May 23, 2006

(54) NEGATIVE PRESSURE TYPE ROTARY HEAD DRUM UNIT AND MAGNETIC TAPE DRIVE USING THE SAME

(75) Inventors: Masayuki Kondo, Kanagawa (JP); Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 10/368,727

(22) Filed: Feb. 18, 2003

(65) Prior Publication Data

US 2003/0179504 A1    Sep. 25, 2003

(30) Foreign Application Priority Data

Feb. 19, 2002  (JP)  ............................ P2002-041373

(51) Int. Cl.
*G11B 5/52* (2006.01)
(52) U.S. Cl. .................................... 360/221; 360/271.5
(58) Field of Classification Search ............. 360/271.5, 360/221, 221.1
See application file for complete search history.

(56) References Cited

U.S. PATENT DOCUMENTS 6,678,123 B1 * 1/2004 Takayama et al. ....... 360/271.5
2002/0159197 A1 * 10/2002 Takayama et al. ....... 360/271.5

FOREIGN PATENT DOCUMENTS

JP         11-273021        10/1999
JP         2001-297417      10/2001

* cited by examiner

*Primary Examiner*—A. J. Heinz
(74) *Attorney, Agent, or Firm*—Sonnenschein, Nath & Rosenthal LLP

(57) ABSTRACT

Disclosed herein is a rotary head drum unit including a cylindrical drum surface and a magnetic head for recording/reproducing a signal to/from a magnetic tape running along the drum surface. The magnetic head has a tape sliding surface adapted to come into sliding contact with the magnetic tape. The tape sliding surface of the magnetic head is positioned at a level lower than the height of the magnetic tape flying above the drum surface. The magnetic tape is brought into contact with the tape sliding surface by negative pressure. With this configuration, an increase in contact pressure of the magnetic tape sliding on the tape sliding surface of the magnetic head can be prevented and the contact pressure can be uniformed to thereby prevent a reduction and variations in magnetic recording or reproduction output.

6 Claims, 13 Drawing Sheets

F I G. 2
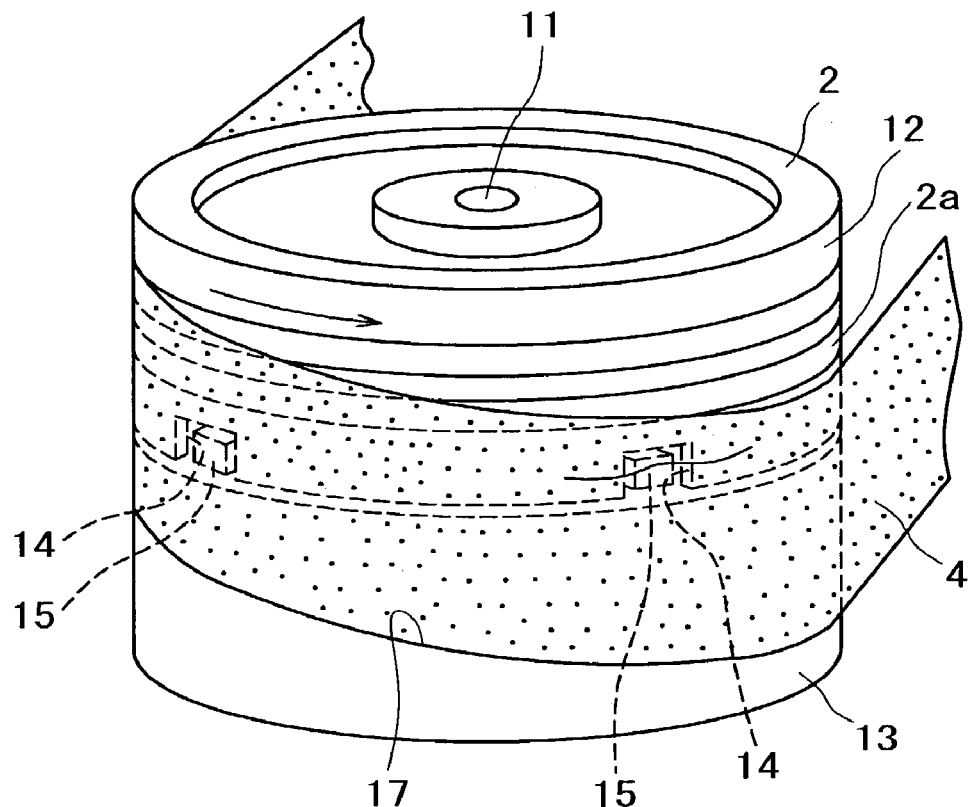
F I G. 3
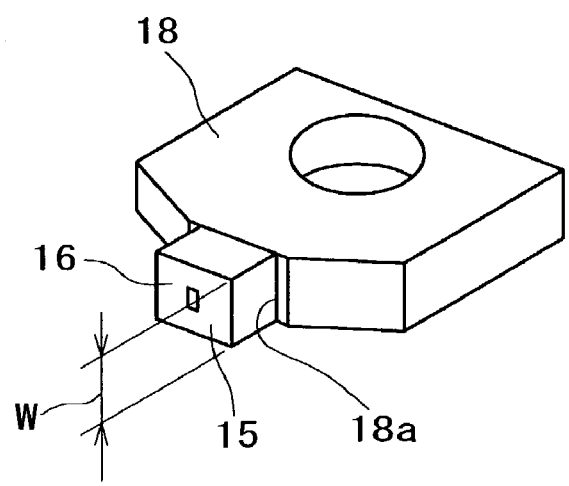

NEGATIVE PRESSURE TYPE ROTARY HEAD DRUM UNIT AND MAGNETIC TAPE DRIVE USING THE SAME

RELATED APPLICATION DATA

The present application claims priority to Japanese Application(s) No(s). P2002-041373 filed Feb. 19, 2002, which application(s) is/are incorporated herein by reference to the extent permitted by law.

BACKGROUND OF THE INVENTION

The present invention relates to a rotary head drum unit and a magnetic tape drive, and more particularly to a technique for improving a contact condition between a magnetic head and a magnetic tape.

A rotary head drum unit is used to record a signal to a magnetic tape such as a tape-like magnetic recording medium or reproduce a signal recorded on the magnetic tape. Such a rotary head drum unit is mounted in a video tape recorder, for example, and this unit is composed of a fixed drum and a rotating drum. The rotating drum is provided with a magnetic head, so that when the rotating drum is rotated in one direction, the magnetic head comes into sliding contact with the magnetic tape to thereby record or reproduce a signal.

Referring to FIG. 22, there is shown a rotary head drum unit a in the related art. The rotary head drum unit a has a fixed drum b fixed to a chassis (not shown) and a rotating drum c having substantially the same outer diameter as that of the fixed drum b.

The rotating drum c is fixed to a rotating shaft (not shown) that is rotatable relative to the fixed drum b. The fixed drum b and the rotating drum c are axially opposed to each other with a given gap defined therebetween. The rotating shaft is rotated by a motor (not shown).

A plurality of recesses (which will be hereinafter referred to as "head mounting holes") d are formed along the lower circumferential edge of the rotating drum c so as to be spaced apart from each other at given intervals in the circumferential direction. A magnetic head e is positioned in each head mounting hole d.

As shown in FIGS. 22 and 24, each magnetic head e projects from the outer circumferential surface of the rotating drum c.

The amount of projection of each magnetic head e from the outer circumferential surface of the rotating drum c is set larger than the flying height of a magnetic tape h above a drum surface (e.g., the cylindrical surface of the rotary head drum unit a), thereby obtaining a contact pressure of the magnetic tape h to a tape sliding surface i of the magnetic head e as will be hereinafter described.

As shown in FIGS. 23 and 24, each magnetic head e is mounted on a head substrate f, and each head substrate f is fixed to the rotating drum c at an arbitrary position in such a manner that each magnetic head e projects from the corresponding head mounting hole d.

The outer circumferential surface of the fixed drum b is formed with a lead guide portion g extending substantially helically for guiding the lower edge of the magnetic tape h helically wrapped around the rotary head drum unit a during running of the magnetic tape h.

When tape loading is carried out, the rotary head drum unit a is rotated and the magnetic tape h wrapped a given angle around the rotary head drum unit a is run in a given direction (see FIG. 22).

In the rotary head drum unit a, the rotating drum c is rotated in the condition where the magnetic tape h is running along the lead guide portion g, thereby making each magnetic head e scan the running magnetic tape h in a direction inclined a given angle with respect to the longitudinal direction of the magnetic tape h. Accordingly, the rotary head drum unit a forms a recording track extending in the direction inclined the given angle with respect to the longitudinal direction of the magnetic tape h.

When the rotating drum c is rotated, air is introduced between the drum surface of the rotary head drum unit a and the magnetic tape h, so that the magnetic tape h runs at a given flying height above the drum surface of the rotary head drum unit a (see FIG. 24).

This is due to the fact that an air layer is formed between the drum surface of the rotary head drum unit a during rotation and the magnetic tape h during running, and that a pressure difference between this air layer and the atmospheric air existing on the opposite side of this air layer with respect to the magnetic tape h is held constant in relation to a tape tension or the like of the magnetic tape h, thereby obtaining a given flying height of the magnetic tape h above the drum surface of the rotary head drum unit a during running of the magnetic tape h.

For example, in the case of a magnetic tape drive system having such specifications that the width of the magnetic tape h is 8 mm, the diameter of the rotating drum c is 40 mm, and the running speed of the magnetic tape h relative to each magnetic head e is 10 m/sec, it is said that the flying height of the magnetic tape h above the drum surface is usually 10 μm or more.

The amount of projection of each magnetic head e from the drum surface is set larger than the flying height of the magnetic tape h above the drum surface. Accordingly, when the magnetic tape h comes into sliding contact with each magnetic head e projecting from the drum surface of the rotary head drum unit a, the magnetic tape h forms a tent-shape at each magnetic head e according to the amount of projection of each magnetic head e (see FIGS. 22 and 24).

That is, the magnetic tape h is urged by each magnetic head e to form a ridge along the tape sliding surface i of each magnetic head e. In this condition where the tent-shape is formed in the magnetic tape h, a signal is recorded or reproduced.

The formation of the tent-shape in the magnetic tape h means that a portion of the magnetic tape h corresponding to the tape sliding surface i of each magnetic head e is curved. Accordingly, there is a possibility that the magnetic tape h may be partially separated from a central portion of the tape sliding surface i of each magnetic head e.

To cope with this, the tape sliding surface i of each magnetic head e is sometimes formed into a curved surface so as to stabilize the contact condition of the magnetic tape h to the tape sliding surface i, i.e., to uniform the contact pressure therebetween.

However, the tape sliding surface i of each magnetic head e has a size of 1 mm×100 μm, for example, so that it is not necessarily easy to form the tape sliding surface i into a curved surface.

Further, the tape sliding surface i may be formed into a curved surface only by predicting the curvature of the tent-shaped sliding portion of the magnetic tape h. However, the curvature of the tape sliding surface i does not always become equal to the curvature of the tent-shaped sliding portion of the magnetic tape h.

In particular, the tent-shape of the magnetic tape h depends greatly on the stiffness of the magnetic tape h. FIG.

25 shows a contact condition of a magnetic tape j having a high stiffness (which will be hereinafter referred to as "high-stiffness tape") and of a magnetic tape k having a low stiffness (which will be hereinafter referred to as "low-stiffness tape") with respect to the tape sliding surface i. In the case that the shape of the tape sliding surface i is designed to accommodate the high-stiffness tape j, the low-stiffness tape k may be separated from a central portion of the tape sliding surface i. Conversely, in the case that the shape of the tape sliding surface i is designed to accommodate the low-stiffness tape k, the high-stiffness tape j may come into contact with only a central portion of the tape sliding surface i.

The low-stiffness tape k is so curved as to follow the shape of the projecting magnetic head e more than the high-stiffness tape j, so that the slope of the tent-shape is steeper and the curvature of a top portion of the tent-shape (a portion facing the tape sliding surface i) is therefore larger. Accordingly, in the case that the shape of the tape sliding surface i is designed to accommodate the high-stiffness tape j, there arises a problem that the low-stiffness tape k does not come into contact with the tape sliding surface i (see FIG. 25), and the contact of the magnetic tape h and each magnetic head e becomes non-uniform, causing a reduction and variations in recording or reproduction output.

For the above reasons, the contact (contact condition) between each magnetic head e and the magnetic tape h in the initial stage of use of the rotary head drum unit a is not stable, so that "poor contact" may frequently occur. In many cases, the contact condition of the magnetic tape h to each magnetic head e becomes better when the magnetic head is worn after use of the rotary head drum unit a.

Further, the tape sliding surface of each magnetic head may be polished to match the tent-shape by using a polishing tape during the manufacture of the rotary head drum unit. However, this method causes an increase in manufacturing time, and the stiffness of the polishing tape is not always equal to the stiffness of the actual magnetic tape. The stiffness of the actual magnetic tape differs according to the kind of tape, the manufacturer of the tape, etc. Therefore, the above method using the polishing tape is not an effective means for solving the problem.

Other means for solving the problem are described in Japanese Patent Laid-open No. Hei 11-273021 and No. 2001-297417. The solution described in the former publication is forming a recess in the vicinity of the gap on a magnetic head. The solution described in the latter publication is forming a recess in the vicinity of a magnetic head on a drum surface. By forming such a recess, the volume of the recess is made larger than that of another portion, thereby obtaining negative pressure in the recess.

Accordingly, the leading and trailing edges of the tent-shape of the magnetic tape h are attracted into the recess by negative pressure, thereby making the tent-shape uniform to suppress variations in the contact pressure of the magnetic tape with respect to the magnetic head irrespective of a difference in stiffness between magnetic tapes.

However, in each of the above publications, the magnetic head projects from the drum surface by an amount larger than the flying height of the magnetic tape to form the tent-shape of the magnetic tape. This configuration is basically similar to that shown in FIGS. 22 to 24.

Where the recess is formed on the drum surface in the vicinity of the magnetic head or on the tape sliding surface of the magnetic head, the leading and trailing edges of the tent-shape are attracted into the recess by negative pressure, resulting in positive contact, between and increased contact pressure between the magnetic tape and the tape sliding surface of the magnetic head. As a result, there is a possibility of increase in wear or damage of the magnetic head and the magnetic tape.

Further, in association with a recent demand for high-capacity recording, a magnetic tape is elongated and the thickness thereof is therefore reduced. A thinner magnetic tape is lower in stiffness than a conventional magnetic tape. A low-stiffness magnetic tape is more susceptible to physical variations than a high-stiffness magnetic tape. That is, the contact pressure between the low-stiffness magnetic tape and the magnetic head is easily varied to result in acceleration of a reduction and variations in recording or reproduction output.

Further, in response to high-speed rotation of the rotary head drum unit a required for high-speed transfer of data and broadening of the band of recording and reproduction signals, it is required to suppress variations in the contact condition between the magnetic tape and the tape sliding surface of the magnetic head, and the conditions for obtaining a good contact condition are narrowed.

While the rotary head drum unit a in the related art mentioned above is of an upper-drum rotating type, the above problems may also occur with lower-drum rotating type and intermediate-drum rotating type rotary head drum units.

SUMMARY OF THE INVENTION

It is accordingly an object of the present invention to provide a rotary head drum unit that can prevent an increase in contact pressure of a magnetic tape sliding on a tape sliding surface of a magnetic head and suppress variations in the contact pressure. In this way, a reduction and variations in magnetic recording or reproduction output can be prevented.

In accordance with an aspect of the present invention, there is provided a rotary head drum unit including a cylindrical drum surface, and a magnetic head for recording/reproducing a signal to/from a magnetic tape running along the drum surface, the magnetic head having a tape sliding surface adapted to come into sliding contact with the magnetic tape, wherein the tape sliding surface of the magnetic head is positioned at a level lower than the height of the magnetic tape flying above the drum surface and the magnetic tape is brought into contact with the tape sliding surface by negative pressure.

In accordance with another aspect of the present invention, there is provided a magnetic tape drive including a rotary head drum unit having a cylindrical drum surface and a magnetic head for recording/reproducing a signal to/from a magnetic tape running along the drum surface, the magnetic head having a tape sliding surface adapted to come into sliding contact with the magnetic tape, and tape running means for running the magnetic tape along a given path, wherein the tape sliding surface of the magnetic head is positioned at a level lower than the height of the magnetic tape flying above the drum surface, the magnetic tape is brought into contact with the tape sliding surface by negative pressure.

According to the present invention, the magnetic tape is brought into contact with the tape sliding surface of the magnetic head by negative pressure, so that the contact pressure between the magnetic tape and the magnetic head can be suppressed to thereby reduce wear or damage of the magnetic tape and the magnetic head.

Further, by preliminarily setting the contact condition of the magnetic tape to high-stiffness, the compatibility in contact condition with other types of magnetic tapes (e.g., various magnetic tapes having different stiffnesses) can be easily provided to thereby support the advent of a low-stiffness magnetic tape in association with a recent tendency to reduce the thickness of a magnetic tape. Accordingly, even in the case of using low-stiffness magnetic tape, the magnetic tape can be brought into contact with the magnetic head at a given contact pressure to thereby prevent a reduction and variations in recording or reproduction output.

Further, even in the initial stage of use of the rotary head drum unit, the contact condition between the magnetic tape and the magnetic head can be kept stable.

Other objects and features of the invention will be more fully understood from the following detailed description and appended claims when taken with the accompanying drawings.

BRIEF DESCRIPTION OF THE DRAWINGS

FIG. 2 is a schematic perspective view of a rotary head drum unit according to a first preferred embodiment of the present invention;

FIG. 3 is an enlarged-perspective view of a magnetic head mounted in the rotary head drum unit shown in FIG. 2;

DETAILED DESCRIPTION OF THE PREFERRED EMBODIMENTS

Some preferred embodiments of the present invention will now be described in detail with reference to the attached drawings.

Figure 1:
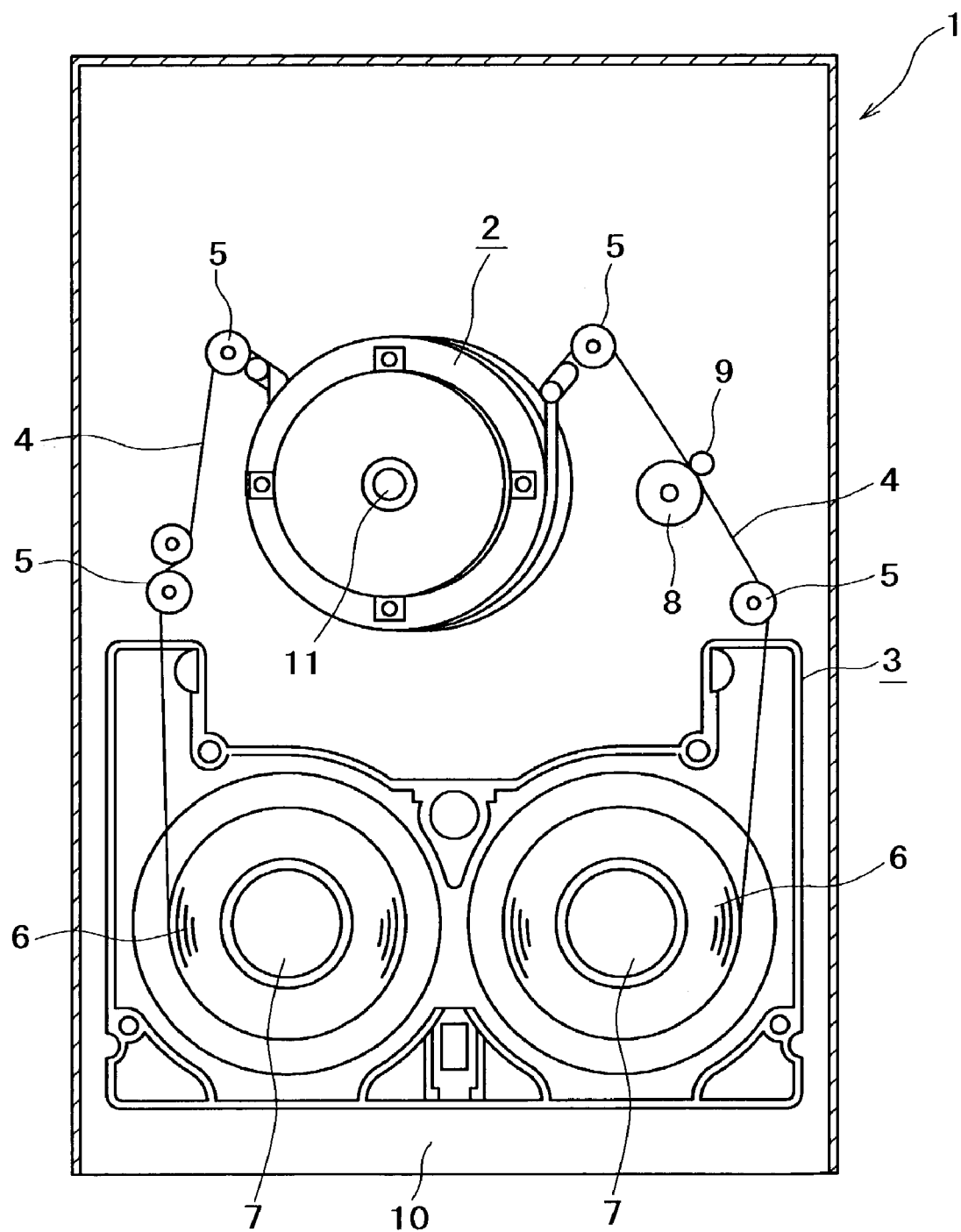
FIG. 1 is a schematic plan view of a preferred embodiment of the magnetic tape drive according to the present invention.

Referring first to FIG. 1, there is shown a magnetic tape drive 1 according to a preferred embodiment of the present invention. The magnetic tape drive 1 includes a rotary head drum unit 2, a plurality of guide pins 5 for drawing a magnetic tape 4 out of a tape cassette 3 and wrapping the drawn magnetic tape 4 around the rotary head drum unit 2 to form a given tape path, a pair of reel supports 7 for supporting a pair of reels 6 accommodated in the tape cassette 3, a pinch roller 8, and a capstan shaft 9 for running the magnetic tape 4 in cooperation with the pinch roller 8.

Reference numeral 10 denotes a chassis of the magnetic tape drive 1. The rotary head drum unit 2 is arranged so that its axis is slightly inclined with respect to the chassis 10. When the tape cassette 3 is loaded into a cassette loading portion of the magnetic tape drive 1, the magnetic tape 4 is drawn out of the tape cassette 3 toward the rotary head drum unit 2 by the guide pins 5 and wrapped around the rotary head drum unit 2. At the same time, the magnetic tape 4 is sandwiched between the pinch roller 8 and the capstan shaft 9 to form a tape path.

FIG. 1 schematically shows a condition where the tape cassette 3 is loaded in the magnetic tape drive 1 and the tape path is formed.

After the tape path is thus formed, the rotary head drum unit 2 is rotated and the capstan shaft 9 is also rotated to thereby run the magnetic tape 4 at a constant speed.

The guide pins 5, the pinch roller 8, and the capstan shaft 9 substantially correspond to tape running means for running a magnetic tape along a given path as defined in claim 10.

As shown in FIG. 2, the rotary head drum unit 2 includes a fixed shaft 11 fixed to the chassis 10, a rotating drum 12 rotatably supported through a bearing (not shown) to the fixed shaft 11, and a fixed drum 13 positioned under the rotating drum 12 and fixed to the chassis 10. The fixed drum 13 and the rotating drum 12 are axially opposed to each other with a given gap defined therebetween. A plurality of recesses (which will be hereinafter referred to as "head mounting holes") 14 are formed along the lower circumferential edge of the rotating drum 12 so as to be spaced apart from each other at given intervals in the circumferential direction. A magnetic head 15 is positioned in each head mounting hole 14.

The outer circumferential surface of the fixed drum 13 is formed with an upward facing step surface (lead guide portion) 17 extending substantially helically for guiding the lower edge of the magnetic tape 4 helically around the rotary head drum unit 2 during running of the magnetic tape 4.

FIGS. 1 to 8 show a first preferred embodiment of the rotary head drum unit according to the present invention.

Figure 4:
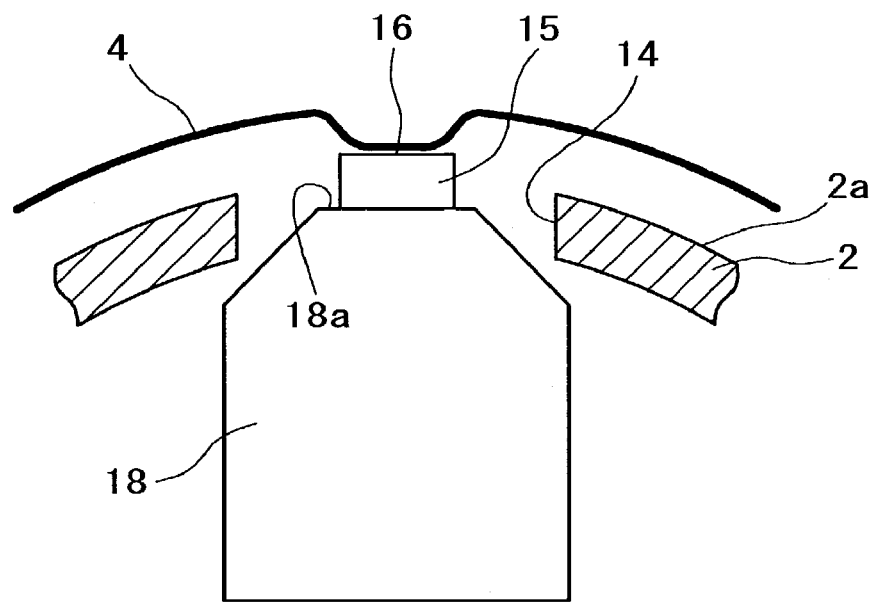
FIG. 4 is an enlarged sectional view schematically showing a condition where a magnetic tape is in contact with the magnetic head shown in FIG. 3.

As shown in FIGS. 2 and 4, the magnetic heads 15 mounted in the respective head mounting holes 14 of the rotating drum 12 in the rotary head drum unit 2 slightly project from the outer circumferential surface of the rotating drum 12 as a part of a drum surface 2a forming the cylindrical surface of the rotary head drum unit 2.

As shown in FIGS. 3 and 4, each magnetic head 15 is mounted on a front end surface 18a of a head substrate 18, and each head substrate 18 is fixed to the rotating drum 12 at an arbitrary position in such a manner that each magnetic head 15 slightly projects from the corresponding head mounting hole 14. Since each magnetic head 15 is mounted on the front end surface 18a of the corresponding head substrate 18, the dimension of the rotary head drum unit 2 in its vertical direction (axial direction) can be reduced. However, the mounting structure of each magnetic head 15 is not limited to the above structure in the present invention. For example, each magnetic head 15 may be mounted on the upper surface of the head substrate 18.

As shown in FIG. 4, the amount of projection of each magnetic head 15 from the drum surface 2a forming the cylindrical surface of the rotary head drum unit 2 is set smaller than the flying height of the magnetic tape 4 wrapped around the rotary head drum unit 2 during running of the magnetic tape 4.

Figure 23:
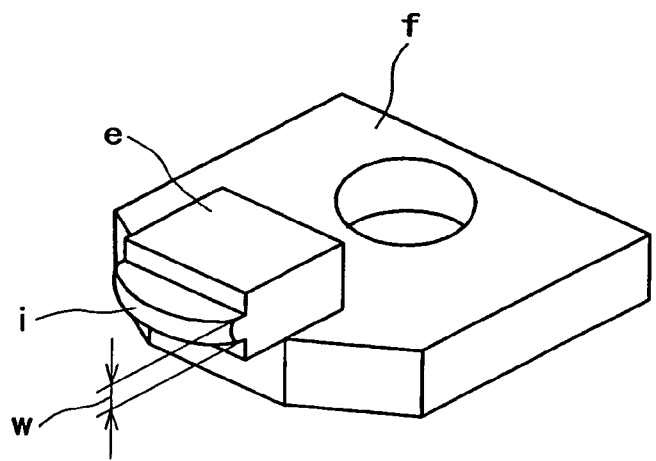
FIG. 23 is an enlarged perspective view of a head substrate and a magnetic head mounted in the rotary head drum unit shown in FIG. 22.
Figure 24:
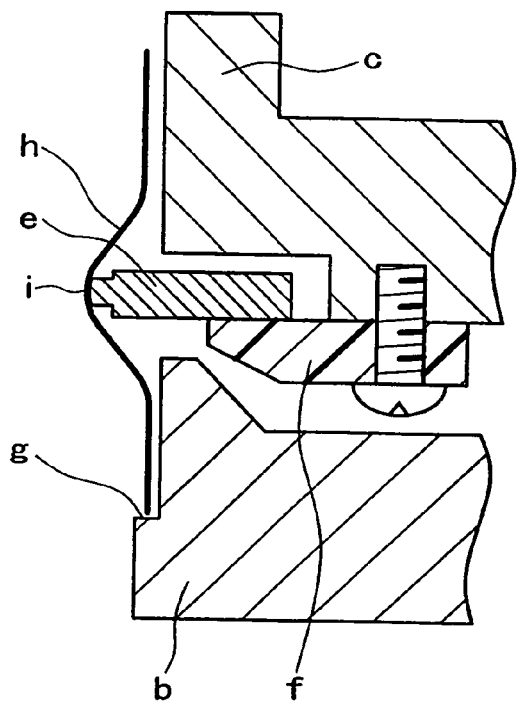
FIG. 24 is a vertically sectional view showing a contact condition of a magnetic tape to the magnetic head shown in FIG. 23.
Figure 25:
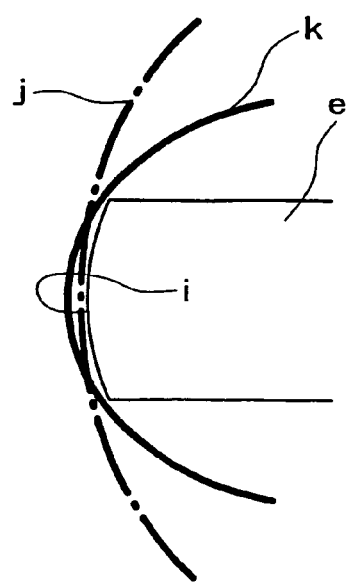
FIG. 25 is an enlarged view schematically showing a contact condition of a low-stiffness tape and a high-stiffness tape to the magnetic head shown in FIG. 23.

As shown in FIGS. 3 and 4, each magnetic head 15 has a substantially flat front end surface (which will be hereinafter referred to as "tape sliding surface") 16 on which the magnetic tape 4 slides during running. The tape sliding surface 16 is substantially square or slightly oblong as viewed in elevation. For example, the tape sliding surface 16 is formed in the shape of a rectangle having a size of about 1 mm×1.2 mm. Thus, the head width W (the dimension of the tape sliding surface 16 along the axis of rotation of the rotary head drum unit 2) is larger than the head width w of the magnetic head e in the related art (see FIG. 23).

Each magnetic head 15 is not limited in its type. For example, a so-called wire wound type head, an MR (Magneto Resistive) head, or a GMR (Giant Magneto Resistive) head may be used.

When the tape loading is carried out, the rotary head drum unit 2 is rotated, and the magnetic tape 4 wrapped a given angle around the rotary head drum unit 2 is run in a given direction (see FIG. 1).

During running of the magnetic tape 4, each magnetic head 15 forms a track extending in a direction inclined with respect to the running direction of the magnetic tape 4 to thereby record a signal to the magnetic tape 4, or scans a recorded track to thereby reproduce a signal from the magnetic tape 4 (see FIG. 2).

Figure 5:
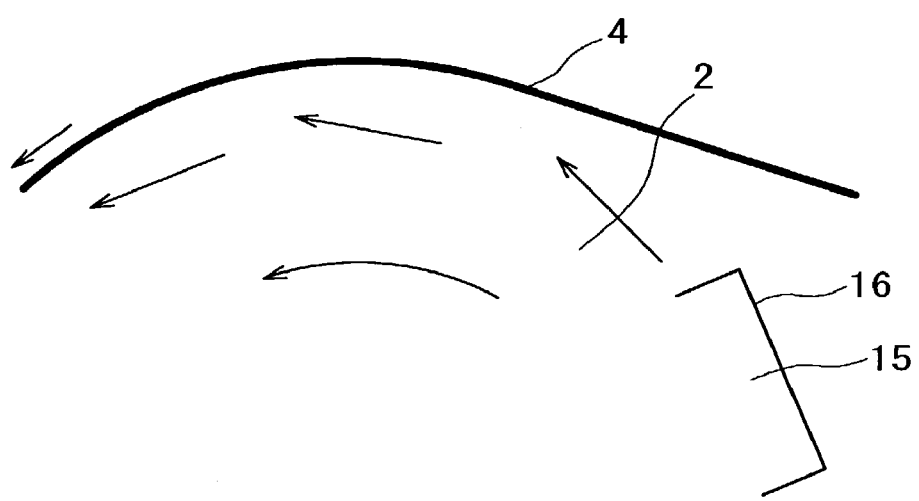
FIG. 5 is an enlarged plan view schematically showing a manner of running the magnetic tape at a given flying height above a drum surface.

When the rotating drum 12 is rotated, air is introduced between the drum surface 2a of the rotary head drum unit 2 and the magnetic tape 4, so that the magnetic tape 4 runs at a given flying height above the drum surface 2a of the rotary head drum unit 2 (see FIG. 5). This is due to the fact that an air layer is formed between the drum surface 2a of the rotary head drum unit 2 and the magnetic tape 4 during running and a pressure difference between this air layer and the atmospheric air existing on the opposite side of this air layer with respect to the magnetic tape 4 is held constant in relation to a tape tension or the like of the magnetic tape 4. In this way, a given flying height of the magnetic tape 4 above the drum surface 2a of the rotary head drum unit 2 during running of the magnetic tape 4 is obtained.

This is due to the fact that an air layer is formed between the drum surface 2a of the rotary head drum unit 2 and the magnetic tape 4 during running, and that a pressure difference between this air layer and the atmospheric air existing on the opposite side of this air layer with respect to the magnetic tape 4 is held constant in relation to a tape tension or the like of the magnetic tape 4, thereby obtaining a given flying height of the magnetic tape 4 above the drum surface 2a of the rotary head drum unit 2 during running of the magnetic tape 4.

Figure 6:
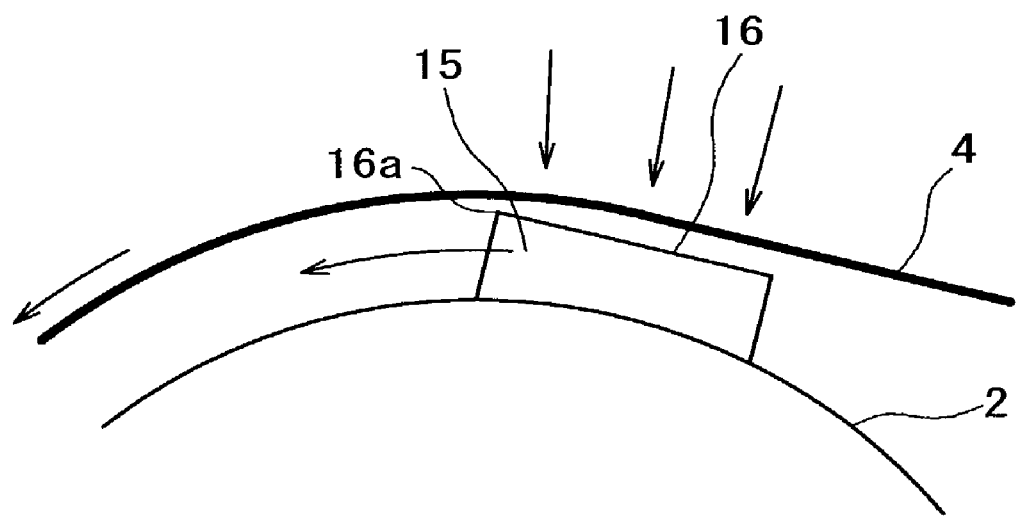
FIG. 6 is a view similar to FIG. 5, schematically showing a manner of producing negative pressure over a tape sliding surface of the magnetic head.
Figure 7:
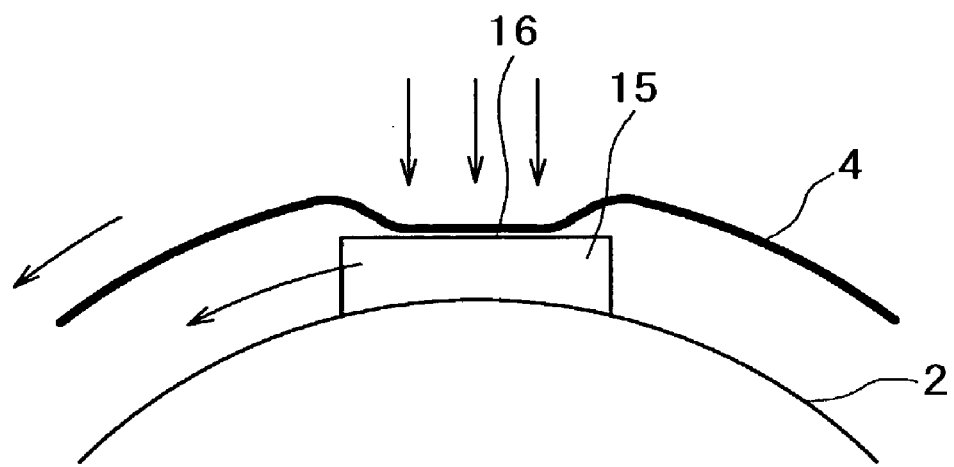
FIG. 7 is a view similar to FIG. 5, schematically showing a condition where the magnetic tape is brought into contact with the tape sliding surface by negative pressure.

When the magnetic tape 4 approaches each magnetic head 15 having the substantially flat tape sliding surface 16 as shown in FIG. 6, the air layer formed between the drum surface 2a and the magnetic tape 4 is forced away by a front edge 16a of the tape sliding surface 16 (a leading edge in the rotational direction of the rotary head drum unit 2; that is, a leading edge first coming into contact with or close to the magnetic tape 4). Accordingly, the amount of air flowing into the gap between the tape sliding surface 16 and the magnetic tape 4 is reduced and the air pressure in this gap is therefore reduced. That is, negative pressure is produced between the magnetic tape 4 and the tape sliding surface 16 to attract the magnetic tape 4 to the tape sliding surface 16. As a result, the magnetic tape 4 comes into contact with the tape sliding surface 16 as shown in FIG. 7.

Such a reduction in the amount of air flowing into the gap between the magnetic tape 4 and the tape sliding surface 16 is determined by the width of each magnetic head 15, i.e., the width W of the tape sliding surface 16.

That is, by increasing the width of each magnetic head 15, the amount of air forced away by the front edge 16a of the tape sliding surface 16 is increased when the magnetic head 15 is moved. Accordingly, the amount of air flowing away from the opposite side edges (upper and lower side edges) of the tape sliding surface 16 is increased, so that negative pressure is produced over the tape sliding surface 16, especially at a vertically central portion thereof, thereby increasing a force of attracting the magnetic tape 4 to the tape sliding surface 16.

Figure 8:
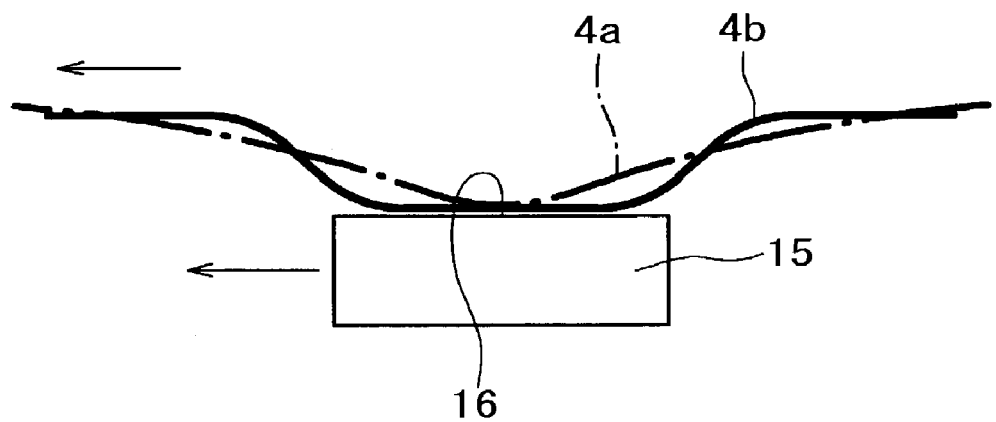
FIG. 8 is an enlarged plan view schematically showing a condition where a high-stiffness magnetic tape comes into contact with the magnetic head and a condition where a low-stiffness magnetic tape comes into contact with the magnetic head.

Thus, the contact of the magnetic tape 4 and the tape sliding surface 16 is caused by negative pressure produced therebetween. Accordingly, as shown in FIG. 8, a high-stiffness magnetic tape 4a comes into contact with a central portion of the tape sliding surface 16, whereas a low-stiffness magnetic tape 4b comes into contact with the substantially entire area of the tape sliding surface 16.

By designing each magnetic head 15 so that the contact pressure between the high-stiffness magnetic tape 4a and the tape sliding surface 16 becomes a predetermined pressure, the low-stiffness magnetic tape 4b can be brought into contact with the tape sliding surface 16 at a pressure higher than the predetermined pressure. Accordingly, the degree of freedom of design can be increased.

That is, by preliminarily setting the contact condition of the high-stiffness magnetic tape 4a as the magnetic tape 4, the compatibility in contact condition with other types of magnetic tapes can be easily provided to have a merit in reducing the stiffness of the magnetic tape 4 in association with a reduction in thickness of the magnetic tape 4 as a trend.

In the rotary head drum unit 2 according to the first preferred embodiment, the magnetic tape 4 can be brought into contact with the tape sliding surface 16 of each magnetic head 15 at a predetermined pressure or higher irrespective of whether the magnetic tape 4 is the high-stiffness magnetic tape 4a or the low-stiffness magnetic tape 4b, thereby preventing a reduction and variations in recording or reproduction output.

Further, even in the initial stage of use of the rotary head drum unit 2, the contact condition between the magnetic tape 4 and each magnetic head 15 can be kept stable.

Further, since the contact of each magnetic head 15 and the magnetic tape 4 is effected by using negative pressure produced therebetween, the contact pressure of the magnetic tape 4 to the magnetic head 15 can be suppressed to thereby reduce wear or damage of the magnetic head 15 and the magnetic tape 4.

The tape sliding surface 16 of each magnetic head is a "substantially flat" surface which means not only a flat surface, but also a slightly curved surface. When the tape sliding surface 16 is a flat surface, it is clear that negative pressure is produced over the tape sliding surface 16. However, even when the tape sliding surface 16 is a slightly curved surface, negative pressure is produced over the tape sliding surface 16. Strictly speaking, negative pressure is produced over the tape sliding surface 16 provided that the curvature of the tape sliding surface 16 is slightly smaller than that of the magnetic tape 4 wrapped around the rotary head drum unit 2 at a given height (i.e., the tape sliding surface 16 is nearly flat). The curvature of the tape sliding surface 16 is a curvature enough to produce negative pressure allowing the attraction of the magnetic tape 4 to the tape sliding surface 16.

In the case that the tape sliding surface 16 is a flat surface, each magnetic head 15 can be easily manufactured, whereas in the case that the tape sliding surface 16 is a slightly curved surface, the contact condition between the magnetic tape 4 and the tape sliding surface 16 can be improved. Thus, it can be said that whether the tape sliding surface 16 is to be formed into a flat surface or a slightly curved surface is within the scope of a design matter.

As mentioned above, the size (the width W) of each magnetic head 15 in a direction perpendicular to the running direction of the magnetic tape 4 is larger than the size (the width w) of the conventional magnetic head e (see FIG. 23), so that negative pressure enough to attract the magnetic tape 4 to the tape sliding surface 16 can be produced over the tape sliding surface 16. By controlling the size (width) of the front edge 16a of the tape sliding surface 16, negative pressure to be produced can be controlled to thereby control the contact condition between the magnetic tape 4 and the tape sliding surface 16.

Figure 22:
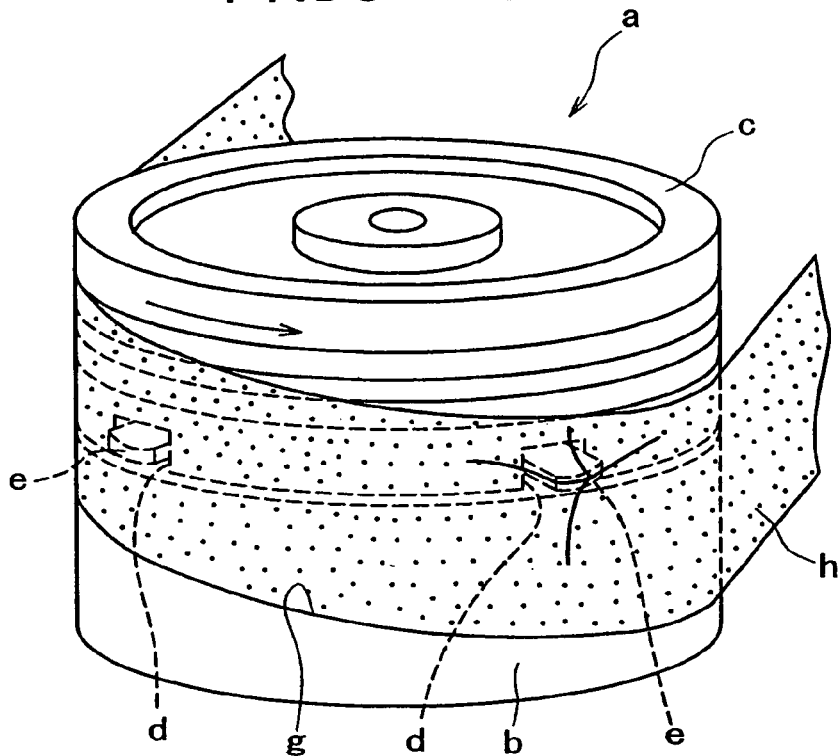
FIG. 22 is a schematic perspective view of a rotary head drum unit in the related art.

In association with this structure of each magnetic head 15, each head mounting hole 14 of the rotary head drum unit 2 is larger in size than the conventional one (head mounting hole d shown in FIG. 22).

Figure 9:
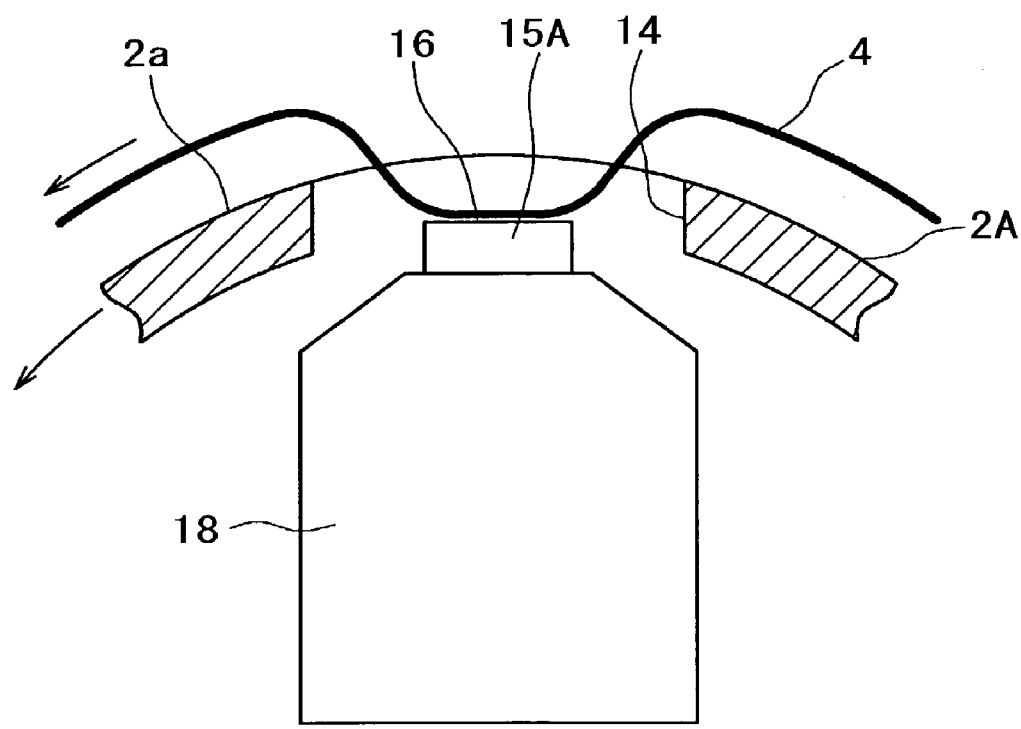
FIG. 9 is an enlarged sectional view of a rotary head drum unit according to a second preferred embodiment of the present invention, schematically showing a condition where a magnetic tape is in contact with a magnetic head.

FIG. 9 shows a second preferred embodiment of the rotary head drum unit according to the present invention. The second preferred embodiment is different from the first preferred embodiment in that the tape sliding surface of each magnetic head is retracted from the drum surface. Accordingly, the following description of the second preferred embodiment will be focused on only this different point, and the description of the other same parts denoted by the same reference numerals in the first embodiment will be omitted herein.

Reference numeral 2A denotes a rotary head drum unit according to the second preferred embodiment. The rotary head drum unit 2A includes a magnetic head 15A provided in the head mounting hole 14. The magnetic head 15A has a tape sliding surface 16A retracted from the drum surface 2a.

When the rotary head drum unit 2A is rotated, the magnetic tape 4 runs at a given flying height above the drum surface 2a as similar to the first preferred embodiment.

The air layer formed between the magnetic tape 4 and the drum surface 2a is increased in sectional area at a position corresponding to the head mounting hole 14, causing a reduction in pressure of the air layer at this position.

The magnetic tape 4 is wrapped around the rotary head drum unit 2A under a given tension, so that the magnetic tape 4 runs linearly under this tension so as to be retracted into the head mounting hole 14.

Accordingly, a portion of the magnetic tape 4 corresponding to the head mounting hole 14 is attracted into the head mounting hole 14 to come into contact with the tape sliding surface 16 of the magnetic head 15A.

The rotary head drum unit 2A according to the second preferred embodiment can exhibit an effect similar to that of the first preferred embodiment. That is, the magnetic tape 4 can be brought into contact with the magnetic head 15A by using negative pressure produced therebetween. Accordingly, a stable contact condition between the magnetic tape 4 and the magnetic head 15A at a predetermined pressure or higher can be obtained irrespective of whether the magnetic tape 4 is a high-stiffness magnetic tape 4a or a low-stiffness magnetic tape 4b, thereby preventing a reduction and variations in recording or reproduction output. Further, since the contact between the magnetic tape 4 and the magnetic head 15A is effected by using negative pressure produced therebetween, the contact pressure of the magnetic tape 4 to the magnetic head 15A can be suppressed to thereby reduce wear or damage of the magnetic head 15A and the magnetic tape 4.

While the contact pressure of the magnetic tape 4 to the magnetic head 15 or 15A is determined by negative pressure produced therebetween, there is a case that negative pressure may be insufficient. By increasing negative pressure to increase the contact pressure between the magnetic tape 4 and the magnetic head 15 or 15A, this contact pressure may be controlled more easily.

As means for increasing negative pressure, the following preferred embodiments and modifications according to the present invention have been made, and by adopting any of these preferred embodiments and modifications individually or in combination, the contact pressure between the magnetic tape 4 and the magnetic head 15 or 15A can be more easily set to a desired pressure.

Negative pressure can be increased by the following means.

(1) Forming an angle of elevation in mounting the magnetic head.

(2) Deviating the magnetic head in the head mounting hole along a tangent line to the rotary head drum unit.

(3) Providing a projection at the front edge of the magnetic head in the rotational direction of the rotary head drum unit.

These means will now be described in sequence.

(1) Forming an angle of elevation in mounting the magnetic head.

Figure 10:
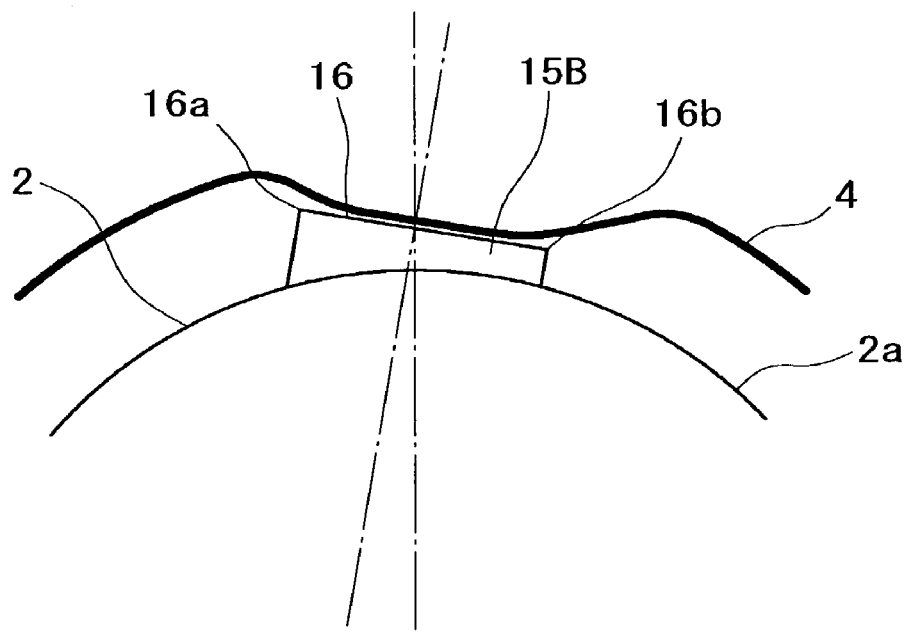
FIG. 10 is an enlarged plan view schematically showing a magnetic head according to a third preferred embodiment of the present invention.

FIG. 10 shows a third preferred embodiment of the rotary head drum unit according to the present invention. Reference numeral 15B denotes a magnetic head according to the third preferred embodiment. The magnetic head 15B projects from the drum surface 2a of the rotary head drum unit 2 so as to be tilted at a negative angle of elevation.

The magnetic head 15 according to the first preferred embodiment is mounted so that the tape sliding surface 16 is parallel to a tangent line to the drum surface 2a at a point corresponding to the center of the tape sliding surface 16. In contrast thereto, the magnetic head 15B according to the third preferred embodiment is tilted at a negative angle of elevation so that the amount of projection of the front edge 16a of the tape sliding surface 16 from the drum surface 2a is greater than that of the rear edge 16b of the tape sliding surface 16.

With this configuration, the air flowing into the gap between the magnetic tape 4 and the tape sliding surface 16 at a position behind the front edge 16a can be further reduced in amount to thereby further reduce the air pressure in this gap. Accordingly, negative pressure greater than that in the first preferred embodiment can be produced between the magnetic tape 4 and the magnetic head 15B.

By controlling the above angle of elevation of the magnetic head 15B, negative pressure to be produced can be controlled to thereby control the contact pressure between the magnetic head 15B and the magnetic tape 4.

Figure 11:
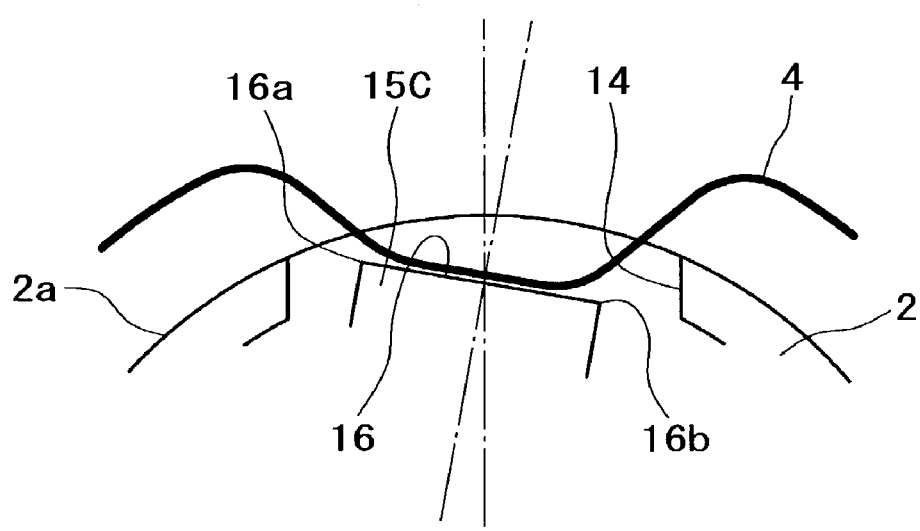
FIG. 11 is a view similar to FIG. 10, showing a modification of the third preferred embodiment.

FIG. 11 shows a modification of the third preferred embodiment. Reference numeral 15C denotes a magnetic head according this modification. The magnetic head 15C is tilted at a negative angle of elevation so that the tape sliding surface 16 is retracted from the drum surface 2a of the rotary head drum unit 2.

With this configuration, negative pressure greater than that in the second preferred embodiment can be produced between the magnetic tape 4 and the magnetic head 15C.

By controlling the above angle of elevation of the magnetic head 15C as in the case of the magnetic head 15B, negative pressure to be produced can be controlled to thereby control the contact pressure between the magnetic head 15C and the magnetic tape 4.

(2) Deviating the magnetic head in the head mounting hole along a tangent line to the rotary head drum unit.

Figure 12:
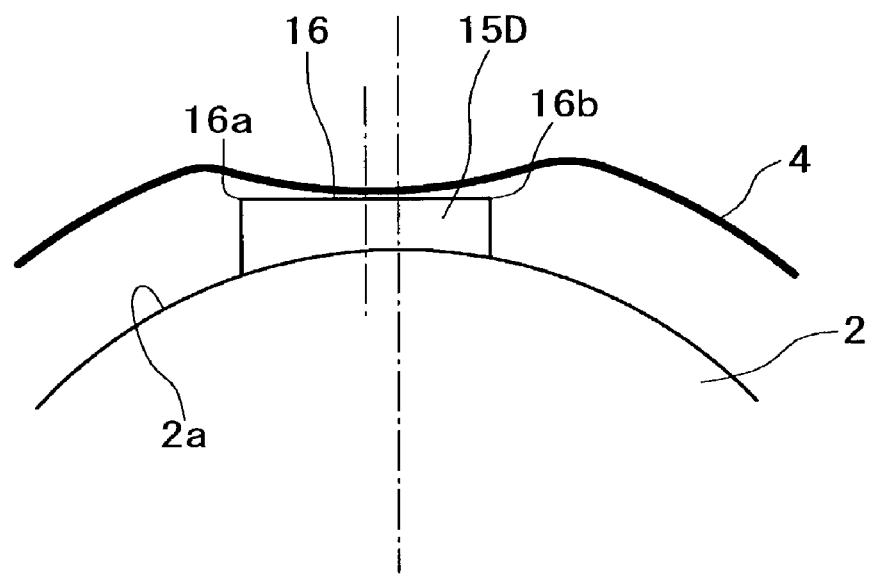
FIG. 12 is an enlarged plan view schematically showing a magnetic head according to a fourth preferred embodiment of the present invention.

FIG. 12 shows a fourth preferred embodiment of the rotary head drum unit according to the present invention. Reference numeral 15D denotes a magnetic head according to the fourth preferred embodiment. The magnetic head 15D projects from the drum surface 2a of the rotary head drum unit 2 so as to be deviated along a tangent line to the drum surface 2a of the rotary head drum unit 2 at a point corresponding to the center of the tape sliding surface 16 in a forward direction of rotation of the rotary head drum unit 2.

The magnetic head 15 according to the first preferred embodiment is mounted so that the center line perpendicular to the tape sliding surface 16 extends in a radial direction of the rotary head drum unit 2. In contrast thereto, the magnetic head 15D according to the fourth preferred embodiment is deviated along the tangent line to the drum surface 2a of the rotary head drum unit 2 in a forward direction of rotation of the rotary head drum unit 2.

With this configuration, the amount of projection of the front edge 16a of the tape sliding surface 16 of the magnetic head 15D from the drum surface 2a becomes greater than that of the rear edge 16b, thereby obtaining the same effect as that in the previous case of forming a negative angle of elevation. Accordingly, the air flowing into the gap between the magnetic tape 4 and the tape sliding surface 16 at a position behind the front edge 16a can be further reduced in amount to thereby further reduce the air pressure at this gap. As a result, negative pressure greater than that in the first preferred embodiment can be produced between the magnetic tape 4 and the magnetic head 15D.

By controlling the amount of deviation (offset amount) of the magnetic head 15D along the tangent line, negative pressure to be produced can be controlled to thereby control the contact pressure between the magnetic head 15D and the magnetic tape 4.

Figure 13:
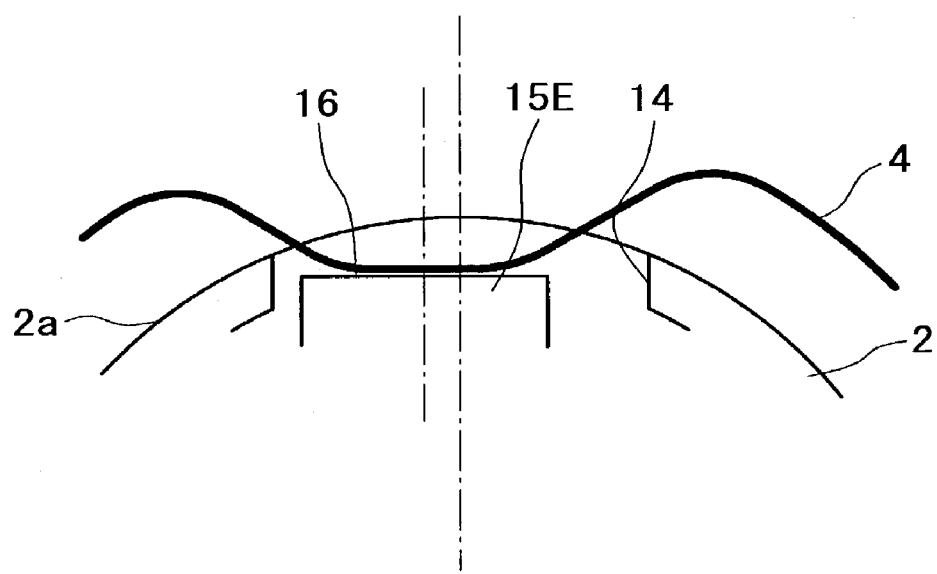
FIG. 13 is a view similar to FIG. 12, showing a modification of the fourth preferred embodiment.

FIG. 13 shows a modification of the fourth preferred embodiment. Reference numeral 15E denotes a magnetic head according to this modification. The magnetic head 15E is deviated along the tangent line to the drum surface 2a of the rotary head drum unit 2 in the forward direction of rotation of the rotary head drum unit 2 so that the tape sliding surface 16 is retracted from the drum surface 2a of the rotary head drum unit 2.

With this configuration, negative pressure greater than that in the second preferred embodiment can be produced between the magnetic tape 4 and the magnetic head 15E.

By controlling the offset amount of the magnetic head 15E as in the case of the magnetic head 15D, negative pressure to be produced can be controlled to thereby control the contact pressure between the magnetic head 15E and the magnetic tape 4.

(3) Providing a projection at the front edge of the magnetic head in the rotational direction of the rotary head drum unit.

Figure 14:
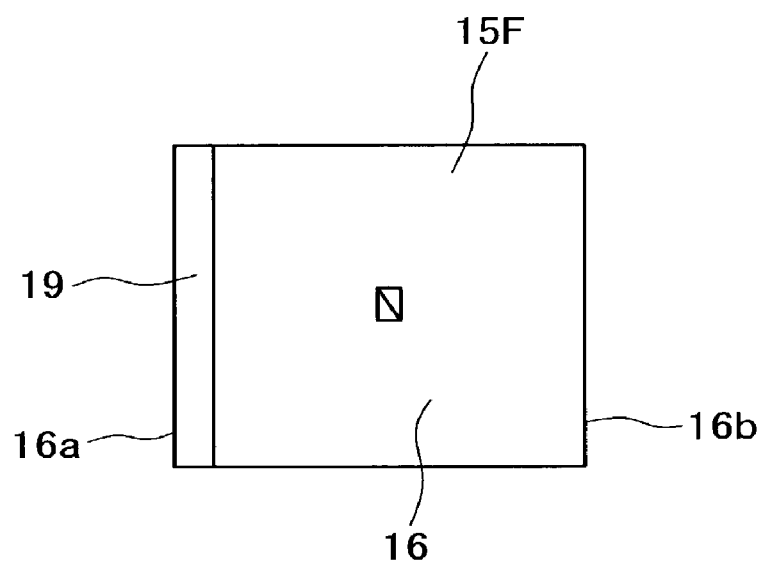
FIG. 14 is an enlarged elevational view schematically showing a magnetic head according to a fifth preferred embodiment of the present invention.
Figure 15:
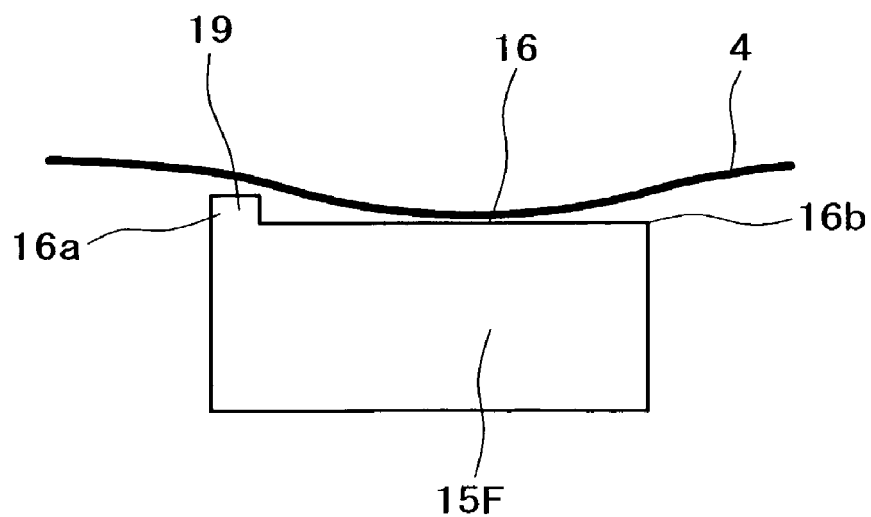
FIG. 15 is an enlarged plan view of the magnetic head shown in FIG. 14.

FIGS. 14 and 15 show a fifth preferred embodiment of the rotary head drum unit according to the present invention. Reference numeral 15F denotes a magnetic head according to the fifth preferred embodiment. The magnetic head 15F has a projection 19 formed at the front edge 16a of the tape sliding surface 16 in the rotational direction of the rotary head drum unit 2.

In each of the magnetic heads 15 and 15A according to the first and second preferred embodiments, the entirety of the tape sliding surface 16 is substantially flat. In contrast thereto, the tape sliding surface 16 of the magnetic head 15F according to the fifth preferred embodiment has the projection 19 extending along the front edge 16a (i.e., over the width W of the tape sliding surface 16).

With this configuration, the amount of projection of the front edge 16a of the tape sliding surface 16 of the magnetic head 15F from the drum surface 2a becomes greater than that of the rear edge 16b, thereby obtaining the same effect as that in the previous case of forming a negative angle of elevation. Accordingly, the air flowing into the gap between the magnetic tape 4 and the tape sliding surface 16 at a position behind the front edge 16a can be further reduced in amount to thereby further reduce the air pressure at this gap. As a result, negative pressure greater than that in the first preferred embodiment can be produced between the magnetic tape 4 and the magnetic head 15F.

By suitably adjusting the height of the projection 19 of the magnetic head 15F, negative pressure to be produced can be controlled to thereby control the contact pressure between the magnetic head 15F and the magnetic tape 4.

While the projection 19 extends over the length of the front edge 16a in this embodiment, the present invention is not limited to this configuration. For example, the projection 19 may be formed at only a central portion of the front edge 16a provided that a given negative pressure can be obtained.

Figure 16:
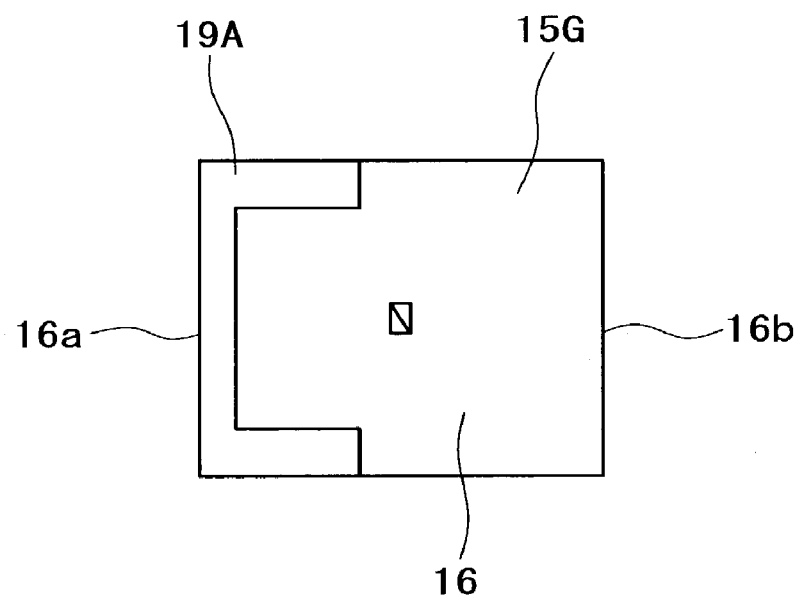
FIG. 16 is a view similar to FIG. 14, showing a modification of the fifth preferred embodiment.

FIG. 16 shows a modification of the magnetic head 15F according to the fifth preferred embodiment. Reference numeral 15G denotes a magnetic head according to this modification. A substantially U-shaped projection 19A opening to the rear edge 16b as viewed in elevation is formed at the front edge 16a of the tape sliding surface 16 of the magnetic head 15G. More specifically, the projection 19A is composed of a vertical portion extending along the front edge 16a over the length thereof and a pair of horizontal portions extending along the upper and lower side edges of the tape sliding surface 16 from the opposite ends of the vertical portion.

With this configuration, the air forced away by the front edge 16a and the projection 19A is hard to flow into the gap between the magnetic tape 4 and the tape sliding surface 16 from its upper and lower side edges. Accordingly, negative pressure to be produced between the tape sliding surface 16 and the magnetic tape 4 can be further increased.

Figure 17:
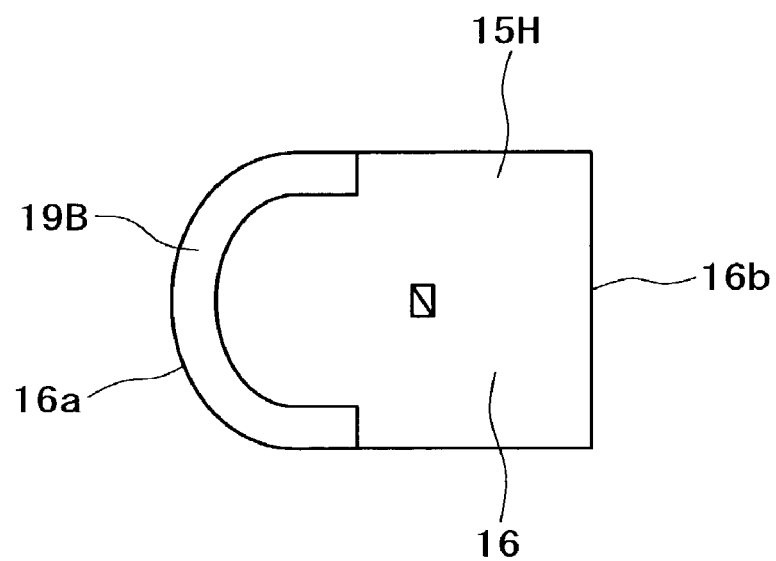
FIG. 17 is a view similar to FIG. 14, showing another modification of the fifth preferred embodiment.

FIG. 17 shows another modification of the magnetic head 15F according to the fifth preferred embodiment. Reference numeral 15H denotes a magnetic head according to this modification. The front edge 16a of the tape sliding surface 16 of the magnetic head 15H is arcuate as viewed in elevation, and a substantially C-shaped projection 19B opening to the rear edge 16b as viewed in elevation is formed at the arcuate front edge 16a. More specifically, the projection 19B is composed of an arcuate portion extending along the arcuate front edge 16a over the length thereof and a pair of horizontal portions extending along the upper and lower side edges of the tape sliding surface 16 from the opposite ends of the arcuate portion.

With this configuration, the air forced away by the front edge 16a and the projection 19B can smoothly flow away to thereby suppress the air flowing into the gap between the magnetic tape 4 and the tape sliding surface 16 from its upper and lower side edges. Accordingly, negative pressure to be produced between the tape sliding surface 16 and the magnetic tape 4 can be further increased.

Each of the magnetic heads 15F, 15G, and 15H according to the fifth preferred embodiment and its modifications mentioned above may project from the drum surface 2a of the rotary head drum unit 2 or the tape sliding surface 16 may be retracted from the drum surface 2a. In each case, negative pressure to be produced over the tape sliding surface 16 can be increased.

In the rotary head drum unit 2 according to the present invention, it is possible to improve the contact condition between the magnetic tape 4 and the magnetic head 15 not only in the running direction of the magnetic tape 4, but also along the width of the magnetic tape 4.

Figure 18:
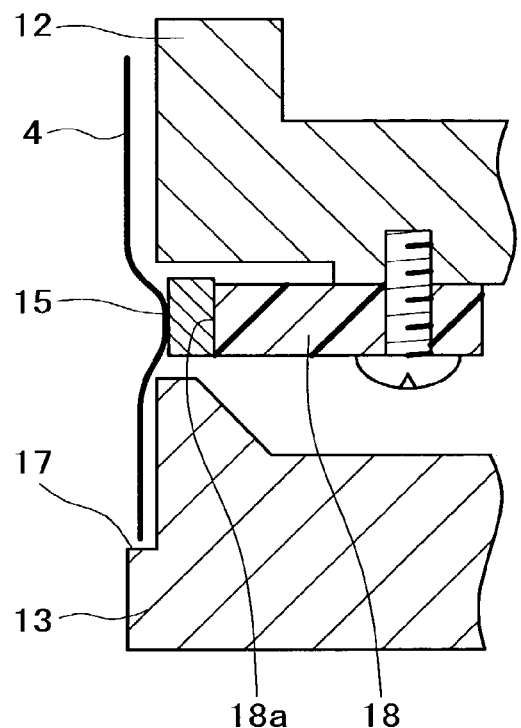
FIG. 18 is a vertically sectional view showing a contact condition of the magnetic tape to the magnetic head along its width according to the present invention.
Figure 19:
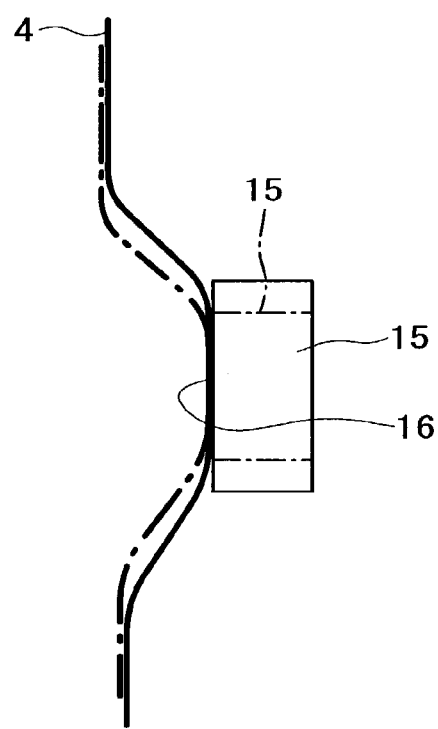
FIG. 19 is an enlarged view showing the contact condition shown in FIG. 18 for illustrating a case of increasing the width of the magnetic head.
Figure 20:
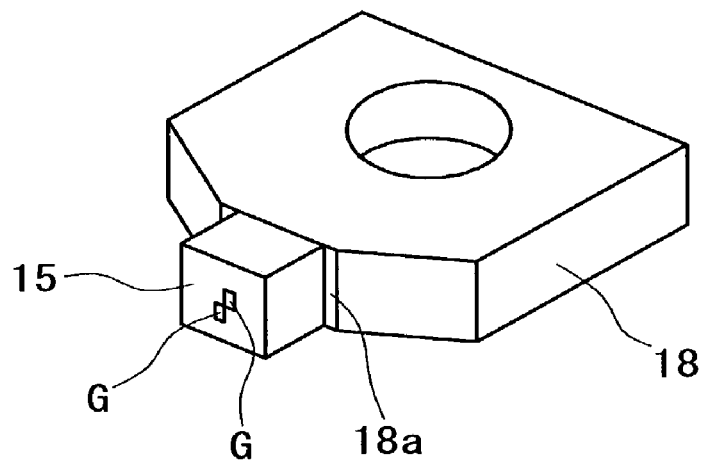
FIG. 20 is a perspective view showing a head substrate and a magnetic head having a multi-gap structure.
Figure 21:
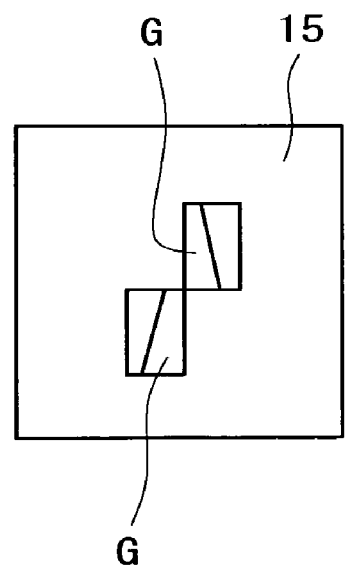
FIG. 21 is an elevational view of the magnetic head having a multi-gap structure shown in FIG. 20.

By enlarging the size of the magnetic head 15 along the width of the magnetic tape 4, the amount of air flowing into the gap between the magnetic tape 4 and the tape sliding surface 16 at its vertically central portion can be reduced, so that the size of a portion of the magnetic tape 4 coming into contact with the tape sliding surface 16 due to negative pressure can be enlarged in the vertical direction of the tape sliding surface 16 (along the width thereof) (see FIGS. 18 and 19). As a result, two or more gaps G can be formed in the single magnetic head 15, thus realizing a so-called multi-gap structure (see FIGS. 20 and 21).

The above-mentioned methods for forming a negative angle of elevation and providing a projection at the front edge may be applied not only to a rotary head drum unit as mentioned above, but also to a fixed head (magnetic head in a so-called linear tape system).

It should be noted that the specific shapes and structures of parts in the above preferred embodiments and their modifications are merely illustrative in embodying the present invention and that the technical scope of the present invention is not limited thereto.

What is claimed is:

1. A rotary head drum unit comprising:
a cylindrical drum surface having a cylindrical surface of a fixed drum and a cylindrical surface of a rotating drum rotatable relative to said fixed drum; and
a magnetic head for recording/reproducing a signal to/from a magnetic tape running along said drum surface, said magnetic head having a substantially flat tape sliding surface adapted to come into sliding contact with said magnetic tape, said tape sliding surface of said magnetic head having a projection at a front edge in a rotational direction of said rotating drum, said tape sliding surface being positioned at a level lower than the height of said magnetic tape flying above said drum surface and retracted from said drum surface;
wherein said cylindrical surface of said rotating drum has a head mounting hole for mounting said magnetic head; and
wherein during operation of said unit said magnetic tape is brought into contact with said tape sliding surface by negative pressure.

2. A rotary head drum unit according to claim 1, wherein said magnetic head is tilted with respect to a tangent line to said drum surface so that a front edge of said tape sliding surface in a rotational direction of said rotating drum is higher in level than a rear edge of said tape sliding surface.

3. A rotary head drum unit according to claim 1, wherein said magnetic head is positioned in said head mounting hole so that a center of said magnetic head in a rotational direction of said rotating drum is deviated from the center of said head mounting hole in said rotational direction.

4. A rotary head drum unit according to claim 1, wherein said projection has a substantially U-shaped configuration opening to a rear edge of said tape sliding surface in a rotational direction of said rotating drum as viewed in elevation.

5. A rotary head drum unit according to claim 1, wherein said projection has a substantially C-shaped configuration opening to a rear edge of said tape sliding surface in a rotational direction of said rotating drum as viewed in elevation.

6. A magnetic tape drive comprising:
a rotary head drum unit having a cylindrical drum surface including a cylindrical surface of a fixed drum and a cylindrical surface of a rotating drum rotatable relative to said fixed drum, and a magnetic head for recording/reproducing a signal to/from a magnetic tape running along said drum surface, said magnetic head having a substantially flat tape sliding surface adapted to come into sliding contact with said magnetic tape; and
tape running means for running said magnetic tape along a given path;
said tape sliding surface of said magnetic head having a projection at a front edge in a rotational direction of said rotating drum, said tape sliding surface being positioned at a level lower than the height of said magnetic tape flying above said drum surface and retracted from said drum surface;

said cylindrical surface of said rotating drum having a head mounting hole for mounting said magnetic head; and during operation said magnetic tape being brought into contact with said tape sliding surface by negative pressure.

* * * * *